Patented Aug. 13, 1946

2,405,646

UNITED STATES PATENT OFFICE 2,405,646

PROCESS OF MANUFACTURING VOLATILE ESTERS OF HYDROXY CARBOXYLIC ACIDS

Edward M. Filachione, Philadelphia, and Charles H. Fisher, Abington, Pa., assignors to United States of America as represented by the Secretary of Agriculture No Drawing. Application May 28, 1945, Serial No. 596,252

8 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a continuation in part of our copending application for patent, Serial No. 482,738, filed April 12, 1943.

Our invention relates to the production of volatile esters from condensation products and polymers of organic acids, and is particularly adapted to the preparation of volatile esters of hydroxy carboxylic acids, such as alkyl lactates.

In the past, esters such as methyl and ethyl lactates, ethyl oxalate, and ethyl mandelate (Fischer and Speier, Ber. 28, 3252-8 (1895)) frequently have been prepared by reacting the acid and alcohols at the boiling point of the latter, and removing the water of reaction and excess alcohol by distillation. This procedure is economically disadvantageous with some esters because low conversions are obtained and the time of reaction is unduly long, with resulting losses from decomposition and side reactions. Conventional methods of preparing esters are especially unsuitable for making alkyl lactates because the alcoholic hydroxy group in hydroxy acids competes with the alcohol in the esterification. Methods ordinarily used to prepare esters are disadvantageous in making methyl esters of hydroxy acids for the same reasons, and in addition, because methanol distils first from the esterification mixture leaving a solution of water and methyl ester. Removal of the water by distillation is accompanied by considerable hydrolysis of the methyl ester.

An object of our invention is to provide a simple and efficient method of making volatile esters of organic acids in high yields.

Another object is to provide a satisfactory method for preparing volatile esters of carboxylic acids from high-molecular weight condensation products of the carboxylic acid concerned.

Another object is to provide a simple and efficient process for preparing volatile esters of hydroxy carboxylic acids, such as methyl lactate, ethyl lactate, methyl glycollate, ethyl glycollate, methyl alpha-hydroxy isobutyrate, methyl citrate, ethyl hydracrylate, and methyl malate.

Another object is to provide a process for manufacturing volatile esters in which the difficulties caused by the presence of water during both the esterification and distillation are decreased or eliminated entirely.

Another object is to provide a method for preparing volatile esters which may be operated either continuously or in batches.

Another object is to provide a satisfactory and useful method for effecting the alcoholysis of condensation products of carboxylic acids.

Other objects will appear from the following description.

We have found that methyl lactate and other volatile esters can be prepared advantageously and in high yields by the process described hereinafter. This process is particularly advantageous for methyl lactate and similar esters because the ester is removed from the sphere of reaction as rapidly as it is formed and opportunity for hydrolysis, decomposition, and side reactions is thus reduced to a minimum. Not only are hydrolysis and decomposition avoided but, as the ester is removed continuously from the reaction zone, the equilibrium is displaced so that the competition between the esterifying alcohol and the alcohol or acyl group in the hydroxy acid or condensation product is overcome. Another advantage of our process is that the reaction products, that is, the material distilling along with alcohol vapor from the reaction zone, contains little or no water which, if present, would tend to hydrolyze the ester. Another advantage of our process is that a wider range of temperatures may be used. For example, we have made methyl lactate satisfactorily by our process using temperatures from 100° to 150° C. Another advantage is that the reaction, when hydroxy acid polymers of relatively high-molecular weight are used, is rapid and can be operated continuously as well as in batches. Still another advantage is that the vapors issuing from the reaction zone, which comprise almost entirely the alcohol and ester of the hydroxy acid, can be passed into a column in which the ester is condensed while the alcohol is recovered from the top of the column as vapor and, if desired, recycled.

Our process comprises the formation and removal of the formed ester, removal being facilitated by a stream of alcohol vapor. Continuous operation of our process comprises continuously removing water formed during the reaction from the hydroxy acid until high-molecular weight condensation products result, continuously adding the condensation products (or a solution of the products in alcohol or other suitable solvent) to a reaction vessel, continuously passing alcohol vapors into the reaction vessel, and continuously withdrawing vapors of the alcohol and formed ester from the reaction vessel. The vapors may be condensed and distilled later to separate the alcohol and ester, or the vapors may be fed into a column where the ester is condensed and withdrawn at the bottom while the alcohol vapor is obtained at the top of the column. The alcohol may be recycled if desired, or it may be collected and stored.

To a large extent our process comprises the alcoholysis of condensation polymers or products of relatively high molecular weight, as distinguished from the monomeric carboxylic acid, dimers of the acid, or condensation products of low molecular weight. Our process is applicable, generally, to the production of relatively volatile esters of hydroxy acids or acids which can be converted into condensation polymers. Since the polymers have very low vapor pressures, the process is flexible and can be operated over a wide range of temperatures and pressures. The process is particularly applicable to the esterification of hydroxy acids which readily form condensation polymers. Other acids, however, including simple carboxylic acids, can be esterified also by this process after a preliminary esterification with a suitable alcohol glycol or hydroxy acid, amine, or amino alcohol.

Our process may be carried out with or without the use of esterification catalysts, but in most cases we prefer to employ a non-volatile catalyst, such as sulfuric acid, toluene sulfonic acid, and phosphoric acid. Any of the known non-volatile esterification catalysts will be found suitable for our process, and they may be employed in the concentrations utilized in other esterification and alcoholysis processes.

Adequate contact between the condensation polymers and the alcohol may be achieved by adding alcohol in the beginning and raising the temperature gradually prior to distillation in a stream of alcohol vapor. Adequate contact may be provided also by passing the polymers, as such or diluted with alcohol or other suitable solvent, down a packed column while the alcohol vapor is passed up the column so as to provide countercurrent flow. Still another procedure for affording adequate contact between polymers and the alcohol is to operate under increased pressures. Also, mechanical agitation may be used or the alcohol vapors may be introduced in numerous small bubbles through a distributing spider.

Our invention is illustrated by the following examples:

EXAMPLE I

A mixture of 330 g. of 81.7 percent lactic acid (containing 3 equivalents of lactic acid), 92 g. (1 mole) of glycerol and 0.75 ml. of concentrated sulfuric acid was heated in vacuum (40 mm. of mercury pressure) using a water bath as the source of heat. After 3 hours, during which time the bath temperature was raised to 100° C., there was collected 116 g. of distillate, which was essentially water formed during the reaction. The condensation products, 307 g., which remained in the still pot were a pale yellow viscous liquid.

To 101 g. of the condensation product of glycerol and lactic acid prepared as in the preceding paragraph was added 0.25 ml. more of concentrated sulfuric acid. This was then heated in a bath at 100° C. while liquid methanol was pumped at a rate of 8 ml. per minute into a steam-heated vaporizer and the methanol vapor then was led into the condensation product of glycerol and lactic acid. The exit vapor, composed essentially of methyl lactate and methanol, was led from the reaction flask to a continuous stripping still (lower half heated by steam) where much of the methanol was removed from the vapor stream, condensed, and recycled. The methyl lactate collected at the base of the stripping still contained approximately 30 percent methanol (when the continuous stripping still was heated by steam). After 2.25 hours, the yield of methyl lactate (determined by titration) was 98 percent. The methyl lactate was isolated in 90 percent yield by distillation at 16 mm., where it boiled at 48–50° C.

Glycerol was recovered from the material not volatilized by methanol vapor treatment by neutralizing the sulfuric acid followed by distillation under reduced pressure. The recovery of glycerol was 71 percent.

EXAMPLE II

A mixture of 220 g. of 81.7 percent lactic acid, 62 g. (1 mole) of ethylene glycol, 0.5 ml. concentrated sulfuric acid and 100 ml. of carbon tetrachloride was condensed by refluxing in equipment arranged so that the vapors from the reaction mixture were condensed and led to a Clevenger type trap (J. Am. Pharm. Ass'n., 17 (4) 346), where the water and carbon tetrachloride layers were separated and the carbon tetrachloride returned to the reaction mixture. After 6 hours approximately 80 ml. of water were removed from the esterification reaction. The carbon tetrachloride was then removed from the reaction mixture by distillation at 20–30 mm. at a temperature not exceeding 100° C.

The residual condensation product was then reacted with methanol vapor in the same manner as described in paragraph 2 of Example I. Methyl lactate was obtained in 94 percent yield boiling at 45–48° C./12 mm. The recovery of ethylene glycol was 92 percent.

EXAMPLE III

To 110 g. of 81.7 percent lactic acid solution was added 0.5 ml. of concentrated sulfuric acid. This was fed dropwise to the top of a tower (1" in diameter, 4 ft. long and packed with ¼" Berl Saddles) heated to approximately 100° C. and maintained at 110–115 mm. of pressure. Methallyl alcohol vapor was fed into the bottom of the tower through a short glass tube connecting the tower with a vaporizer. The vapor was generated by distilling the alcohol from the vaporizer, heated by a bath at 80–90° C. Vapors were withdrawn from the top of the tower and were partially condensed. Methallyl lactate was obtained from the condensate by distillation. The boiling point was 82–90° C. at 23 mm.

In one series of reactions, the reaction vessel was a cylindrical chamber containing a fritted glass plate at the bottom. An important purpose of the fritted glass plate was to disperse the methanol vapors as numerous small bubbles. Methanol vapor was introduced into the reaction chamber through the fritted glass plate. The polylactic acid, containing a non-volatile esterification catalyst, was introduced into the reaction vessel through a separatory funnel. The vessel was immersed in an oil bath, maintained at reaction temperature. The vapors withdrawn from the top of the reaction vessel consisted mainly of methanol and methyl lactate. These vapors were condensed and subsequently distilled to separate methyl lactate, or the vapors were led to a stripping column and methanol stripped and recycled, thus obtaining a more concentrated solution of methyl lactate. When it was elected to condense the vapors and then distil the condensed liquid to separate and purify the methyl lactate, it was found advantageous to add a base such as sodium acetate, sodium hydroxide, or sodium carbonate, to the crude methyl lactate prior to distillation, especially when sulfuric acid was used as the alcoholysis catalyst. Results obtained in several preparations are given below in Table I.

Table I.—Methyl lactate from polylactic acid and methanol vapor [a]

| Exp. No. | Available lactic acid, moles | Temp., °C. | Methanol introduced, moles | Addition rate of methanol, millimoles per min. | Conversion into methyl lactate, per cent |
|---|---|---|---|---|---|
| 1 | 0.5 | 140–150 | 7.5 | 15–18 | 77 |
| 2 | 0.47 | 140–150 | 5.0 | 11.1 | 72 |
| 3 | 0.5 | 135–148 | 5.0 | 16 | 70 |
| 4 | 0.5 | 140–150 | 6.0 | 26 | 70 |
| 5 | 0.5 | 120–126 | 5.0 | 20 | 73 |
| 6 | 0.5 | 110–112 | 6.25 | 11 | 89 |
| 7 | 0.5 | 98–102 | 8.75 | 20 | 87 |
| 8 | 0.5 | 110–115 | 6.85 | 23.6 | 90 |

[a] Toluene sulfonic acid (0.5 g.) was used as catalyst.

Our process was also used to make methyl lactate in a packed tower. The packed tower or tube was 1 inch a diameter and 4 feet long. The tower, which was filled with small Berl saddles, was heated electrically. The temperature of the tower was controlled and recorded mechanically. Condensation polymers of lactic acid, as such or dissolved in methanol, were fed continuously into the top of the tower. The catalyst was conveniently dissolved in the polylactic acid prior to introduction into the tower. Methanol vapor was passed continuously into the column near the bottom, and passed up the column and out at the top. The vapors which consisted principally of methanol and methyl lactate, were withdrawn continuously from the top of the column and then passed into a continuous still. Methanol was withdrawn from the top of the still and recycled. The liquid withdrawn from the bottom of the still was mainly methyl lactate, although some methanol and traces of water were present. Results obtained with this equipment are given in Table II.

Table II.—Methyl lactate from polylactic acid [a] and methanol in packed tower

| Exp. No. | Polylactic acid (equiv.) | Catalyst | Addition rate of polyacid, millimoles per min. | Conversion into methyl lactate, per cent |
|---|---|---|---|---|
| 9 | 1.0 | Sulfuric acid (1 cc.). | 11 | 53 |
| 10 | 1.0 | p-Toluene sulfonic acid (1.0 g.). | 6.7 | 55 |
| 11 | 1.0 | ----do---- | 7.7 | 65 |
| 12 | 1.0 | Sulfuric acid (1 cc.). | 16.5 | 85 |

[a] Polylactic acid about 64 to 71 per cent dehydrated.

Our invention is not limited to the particular materials or procedures employed in the examples set forth above. The general applicability of our process to the production of esters of this type will readily be seen by those skilled in the art. In adapting our process to the production of any particular ester, the main considerations are the choice of suitable conditions for converting the acid into condensation polymers or high-molecular weight non-volatile esters, choice of suitable conditions for effecting adequate contact between the polymers and the alcohol, and choice of suitable temperature for effecting the reaction and carrying over the ester mixed with alcohol vapors. For the production of methyl lactate, temperatures between 100° and 150° C. are suitable, but higher temperatures may be used with less volatile esters. The temperature, however, should not exceed the boiling point of the ester by more than about 20° C.

It will likewise be apparent to those skilled in the art that various modifications of the procedure may be employed without departing from the scope of the invention. For example, instead of introducing alcohol vapors into the reaction zone, liquid alcohol could be introduced below the surface of the heated mixture of polymers. Batch or continuous operation may be employed, and various types of reaction vessels may be used.

When operated continuously, a column or tower, packed or unpacked, may be used, or a tower containing bubble caps or plates may be used. Water may be removed continuously from the hydroxy acid or aqueous solution of hydroxy acid, and the hydroxy acid polymers, or condensation products, thus produced may be passed into the reaction chamber and continuously converted into ester as heretofore described. A suitable method is to pass the polymers down a column while the alcohol is passed into the bottom of the column and vapors of alcohol and ester are withdrawn continuously from the top of the column.

Various pressures can be used. Effects of higher pressures are to raise the boiling points of all the materials involved and to increase the concentration of the alcohol in the reaction mixture. Boiling points of the alcohol and ester are lowered by decreased pressures. The alcohol and polymers of hydroxy acids may be passed through a reaction chamber under elevated pressures to effect the formation of ester under a high concentration of alcohol, and then passed into another chamber maintained under diminished, normal or elevated pressures through which vapors of the alcohol are passed.

The alcohol may be saturated or unsaturated, primary, secondary or tertiary, and may have a straight or branched chain. Instead of passing alcohol vapors alone through the reaction zone, a mixture of alcohol and some other volatile chemical may be used. For example, a material forming a constant boiling mixture with the alcohol or ester may be passed into the reaction zone with the alcohol. Also, a material which forms a constant-boiling mixture with water may be added separately or with the alcohol to assist in removing traces of water which might be present under some circumstances. Also, the alcohol introduced into the reaction zone may contain various quantities of esterification or alcoholysis catalyst. Anhydrous salts, such as calcium sulfate and magnesium sulfate, may be introduced into the reaction zone to assist in removing water, if present, from the reactants or products. Agents such as acetic anhydride, ketene, ethylene oxide, alkyl sulfates, alkyl phosphates, and alkyl borates also may be included with the reactants.

The condensation polymers may be prepared by various well-known methods. Lactic acid, for example, can be converted into polymers by heating at various pressures with or without the aid of entraining agents (Watson, Ind. Eng. Chm.

32, 399 (1940)). Moreover, the hydroxy acids may be converted into condensation polymers continuously or by batch operation. Prior to formation of the condensation polymers, various amounts of alcohols, glycols or acids may be added to facilitate the formation of condensation masses which will not yield water, or more than traces of water, when converted into volatile esters of the type which can be prepared according to our invention. To assist in removing the last traces of water from the condensation polymers, agents such as acetic anhydride, acetyl chloride, ketene, ethylene oxide, thionyl chloride, phosphorous pentoxide, phosphorous oxychloride, alkyl sulfates, alkyl phosphates, alkyl borates, alkyl carbonates, metal alkyls, metal alkoxides, calcium carbide, and anhydrous magnesium sulfate may be used.

Since it is advantageous to operate with condensation polymers or products of high-molecular weight, other devices may be used to insure the formation of high-molecular weight products. For example, the condensation product prepared by removing water as long as it is distilled readily may be extracted by solvents, or mixtures of solvents, which extract selectively either the high- or low-molecular weight products. The high-molecular weight products thus obtained may then be converted into esters as described herein, and the low-molecular weight products may be subjected to further water-removal operations.

Having thus described our invention, we claim:

1. The process of manufacturing volatile esters of lactic acid which comprises heating lactic acid and a compound selected from the group consisting of glycerol and ethylene glycol in the presence of an acid catalyst, removing the water formed during the reaction from the condensation product thus formed, passing vapors of an alcohol through such condensation product in the presence of an esterification catalyst at a temperature not below the boiling point of the alcohol and not exceeding the boiling point of the ester to be formed by more than about 20° C., whereby a volatile ester of lactic acid is formed, withdrawing an admixture of the ester and alcohol vapors from the reaction zone, and then recovering the ester from said admixture.

2. The process defined in claim 1 in which the water formed during the reaction and removed from the condensation product is at least 9 grams of water from each 90 grams of 100 percent lactic acid.

3. The process defined in claim 1 in which the alcohol is an alcohol containing not more than 5 carbon atoms per molecule.

4. The process of manufacturing volatile esters of lactic acid which comprises heating lactic acid and glycerol in the presence of an acid catalyst, removing the water formed during the reaction from the condensation product thus formed by distillation, passing vapors of an alcohol through such condensation product in the presence of an esterification catalyst at a temperature not below the boiling point of the alcohol and not exceeding the boiling point of the ester to be formed by more than about 20° C., whereby a volatile ester of lactic acid is formed, withdrawing an admixture of the ester and alcohol vapors from the reaction zone, and then recovering the ester from said admixture.

5. The process of manufacturing volatile esters of lactic acid which comprises heating lactic acid and ethylene glycol in the presence of an acid catalyst, removing the water formed during the reaction from the condensation product thus formed by distillation, passing vapors of an alcohol through such condensation product in the presence of an esterification catalyst at a temperature not below the boiling point of the alcohol and not exceeding the boiling point of the ester to be formed by more than about 20° C., whereby a volatile ester of lactic acid is formed, withdrawing an admixture of the ester and alcohol vapors from the reaction zone, and then recovering the ester from said admixture.

6. The process of manufacturing methyl lactate which comprises heating lactic acid and a compound selected from the group consisting of glycerol and ethylene glycol in the presence of an acid catalyst, removing the water formed during the reaction from the condensation product thus formed, passing vapors of methyl alcohol through such condensation product in the presence of an esterification catalyst at a temperature not below the boiling point of methyl alcohol and not exceeding the boiling point of methyl lactate by more than about 20° C., whereby methyl lactate is formed, withdrawing an admixture of methyl lactate and methyl alcohol vapors from the reaction zone, and then recovering the methyl lactate from said admixture.

7. The process of manufacturing methyl lactate which comprises heating lactic acid and a compound selected from the group consisting of glycerol and ethylene glycol in the presence of an acid catalyst, removing the water formed during the reaction from the condensation product thus formed, passing vapors of methyl alcohol through such condensation product in the presence of an esterification catalyst at a temperature of about 100° to 150° C., whereby methyl lactate is formed, withdrawing an admixture of methyl lactate and methyl alcohol vapors from the reaction zone, and then recovering the methyl lactate from said admixture.

8. The process of manufacturing volatile esters of lactic acid which comprises heating lactic acid and a glycol in the presence of an acid catalyst, removing the water formed during the reaction from the condensation product thus formed, passing vapors of an alcohol through such condensation product in the presence of an esterification catalyst at a temperature not below the boiling point of the alcohol and not exceeding the boiling point of the ester to be formed by more than about 20° C., whereby a volatile ester of lactic acid is formed, withdrawing an admixture of the ester and alcohol vapors from the reaction zone, and then recovering the ester from said admixture.

EDWARD M. FILACHIONE.
CHARLES H. FISHER.